United States Patent [19]
Moriyama et al.

[11] 3,905,693
[45] Sept. 16, 1975

[54] PROJECTOR SUITABLE FOR FILM CARTRIDGE HAVING SELF-DEVELOPING MEANS

[75] Inventors: Inao Moriyama, Ebina; Takashi Itani; Kiyoshi Takahashi, both of Tokyo, all of Japan

[73] Assignee: Canon Kabushiki Kaisha, Tokyo, Japan

[22] Filed: May 29, 1974

[21] Appl. No.: 474,162

[30] Foreign Application Priority Data
May 31, 1973 Japan.............................. 48-61682

[52] U.S. Cl. .................................. 352/130; 352/72
[51] Int. Cl. ........................................... G03c 11/00
[58] Field of Search ............... 354/304, 299, 84, 86; 352/14, 130, 180, 182, 72

[56] References Cited
UNITED STATES PATENTS
3,759,609   9/1973   Eloranta .......................... 352/130
3,800,306   3/1974   Land................................. 352/130

*Primary Examiner*—Monroe H. Hayes
*Attorney, Agent, or Firm*—Toren, McGeady and Stanger

[57] ABSTRACT

The present invention relates to a projector suitable for a film cartridge housing the film and a developer container which can develop the film after photographing, and particularly the projector is suitable for a film cartridge which allows leakage of the developer from the container by gravity during the film development, and can be charged over to take a first position for the film development and a second position for projection of motion picture. At the first position the film is driven to run by a driving mechanism of the projector to effect the film development, and at the second position the developed film is projected.

20 Claims, 10 Drawing Figures

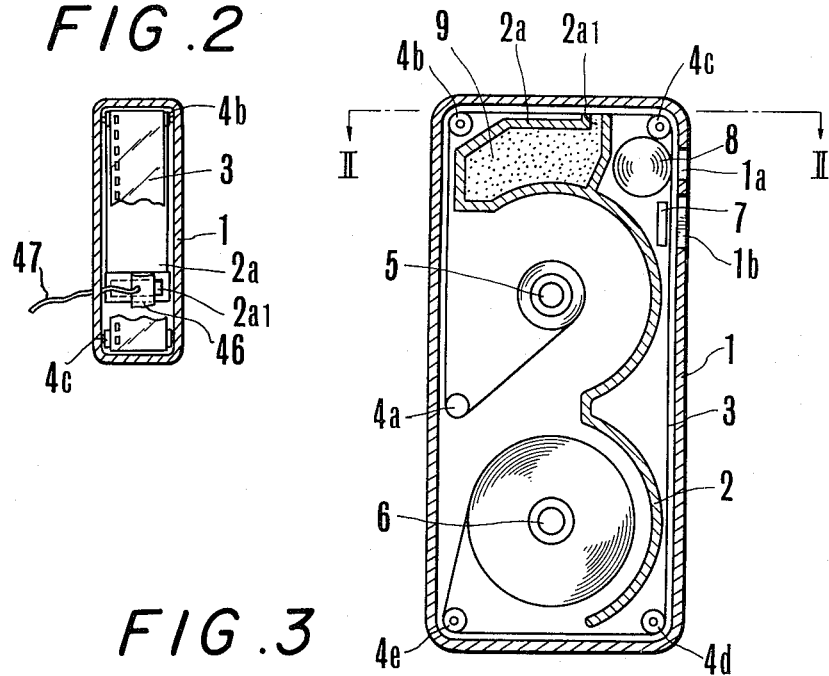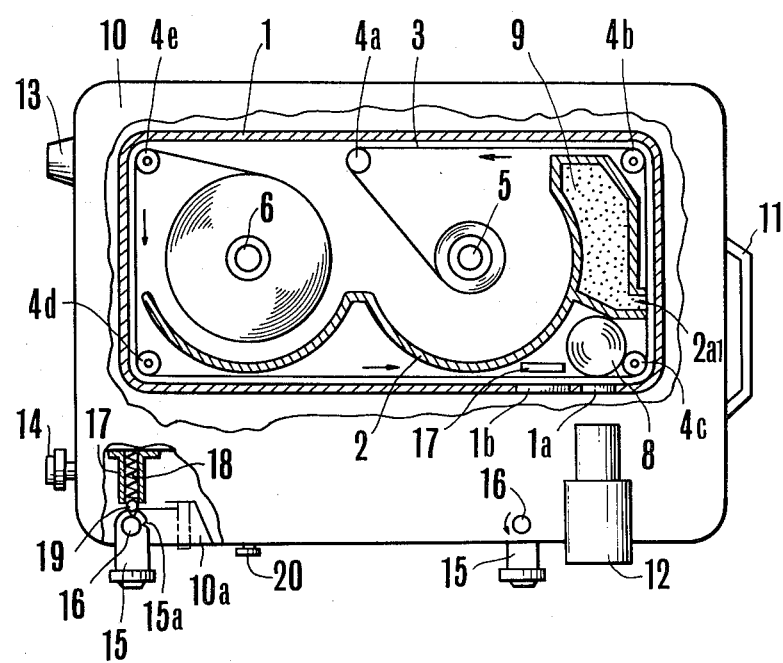

PROJECTOR SUITABLE FOR FILM CARTRIDGE HAVING SELF-DEVELOPING MEANS

BACKGROUND OF THE INVENTION

1. Field of the Invention

The present invention relates to a projector suitable for a film cartridge housing the film and a developer container which can develop the film after photographing.

2. Description of the Prior Art

In recent years, a film cartridge housing a film and a projector on which the cartridge can be mounted have been available in the market.

In case of the film cartridge housing a film and the projector on which the cartridge can be mounted as mentioned above, it is not necessary to take out the film in its naked state every time of the photographing, and the cartridge itself serves as a permanent film storage container, and the photographing operation is very simplified because we can charge the cartridge to the projector by almost only one-touch operation to effect the photographing.

However there is a problem accompanying the above film cartridge. While it is very simple to mount or dismount the cartridge in the projector, it is necessary to package the film after development into the cartridge and thus the development processing at a development shop is very complicated, and requires much labor and time.

This problem is just contrary to the demand by photographers who want to see the results of their photographing as quickly as possible. Therefore, tries and studies have been made up to now to solve the above problem, and various trials have been proposed as in U.S. Pat. No. 3,627,407 to place preliminarily film developer liquid within the cartridge and to treat the film upon completion of photographing without taking out the film from the cartridge for the purpose of saving the film treating time as much as possible. However, in all of the conventional film cartridges provided with film developing liquid therein, the film is driven back in the contrary direction to the running direction at the time of photographing while it is still charged in the camera or the projector, and during the back driving of the film, the developer in the container is applied to the film surface to effect the film development, and the developer within the container leaks out of an opening of the container by its gravity and is applied on the sensitized surface of the film. The attitude of the camera when the projector inverses the film running is same as that when the film is photographed or projected. In this case, however, as the developer contained in the container in the cartridge is usually contained in an excessive amount to retain a small amount after the development of all the film, so that the remaining developer leaks out into the cartridge during the projection of the film to give adverse effects on other part, or to cause redevelopment of the already developed film thus deteriorating the picture quality.

SUMMARY OF THE INVENTION

Therefore, one of the objects of the present invention is to provide a projector which permits quick development of a film cartridge provided with self-developing means.

Another object of the present invention is to provide a projector which permits development treatment of a film cartridge provided with self-developing means and eliminates possibility of redevelopment of the film by developer of the self-developing means at the time of projection by taking a different attitude each for development and projection.

Still other object of the present invention is to provide a specific film cartridge having self-developing means which can be mounted on the projector of the present invention.

Other objects and features of the present invention will be clear from the following descriptions and attached drawings.

BRIEF DESCRIPTION OF THE DRAWINGS

FIG. 1 is a cross sectional plane view showing one embodiment of the film cartridge adaptable to the projector of the present invention, provided with a developer container containing developer.

FIG. 2 is a cross-section along I—I of the film cartridge shown in FIG. 1.

FIG. 3 is a front view of the projector of the present invention, in which the film cartridge shown in FIG. 1 is charged, and shows the projector in the state of film development.

DESCRIPTION OF THE PREFERRED EMBODIMENTS

Figure 4:
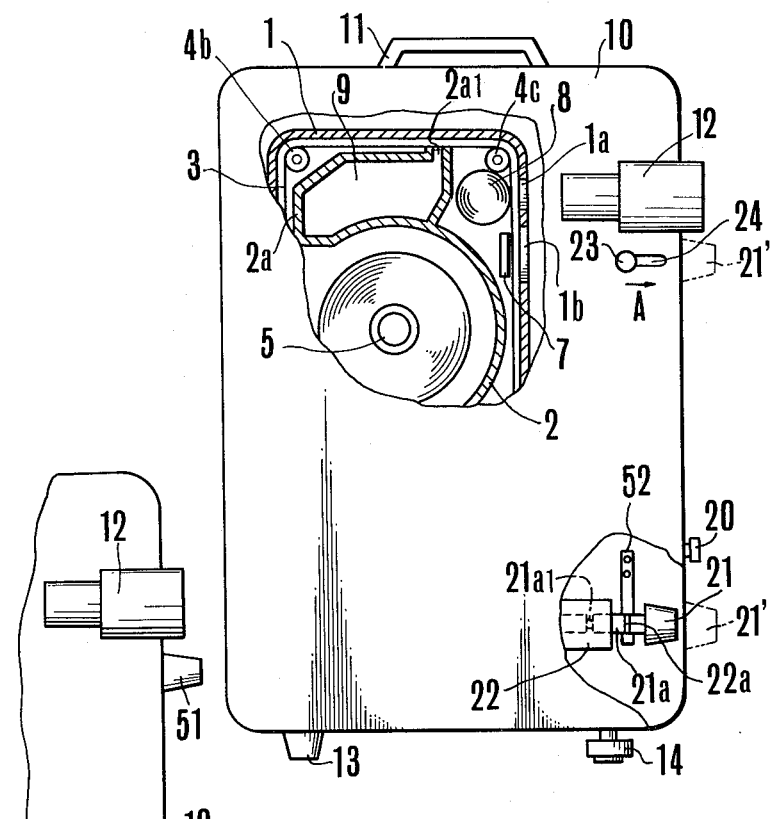
FIG. 4 is a partially broken front view of a second embodiment of the projector of the present invention, in which the film cartridge shown in FIG. 1 is charged and shows the state of film projection.

Hereinunder some embodiments of the present invention will be described referring to the attached drawings.

FIG. 1 and FIG. 2 show respectively a conventional film cartridge having a developer container containing developer for self-development of film, in which the developer in the container leaks out by its gravity at the time of the film development.

In the drawings, 1a is a cartridge case having a first apperture and a second apperture, and 3 is a film which is guided by rollers 4a, 4b, 4c, 4d held rotatably on the cartridge case 1 and is wound around a supplying shaft 5 and a winding shaft 6. 2 is a light-shielding member provided with a developer container 2a containing developer 9 for developing the film 3, which contributes to prevent unexpected incidence of the light from outside through the appertures 1a and 1b on the nondeveloped film in the cartridge. 7 is a pressure plate provided at the second apperture plate portion 1b, which contributes to press the film 3 against an apperture plate (not shown) of the projector when the cartridge is charged in the projector, 8 is a mirror provided at the first apperture 1a, which contributes to reflect the light source within the projector onto the projector optical system for projecting pictures on the film 3 by the projector.

The developer container 2a provided at the light-shielding member 2 is sealed by a seal 46 until the photographing of the film is completed, and has a shielded opening 2a. Therefore, as the apperture 2a of the container is shielded by a seal 46 until the completion of the photographing, the developer 9 is prevented from leaking out from the apperture 2a of the container, and a part of the seal 46 is engaged with a thread 47 whose one end extends out of the cartridge case 1, and when this end portion of the thread is pulled the seal 46 shielding the apperture 2a is taken away therefrom. In this way, after the seal 46 is taken away from the apperture 2a, when the cartridge 1 is inversed in such a way that the apperture 2a comes below the cartridge 1, the developer 9 stored in the container 2a leaks through the apperture 2a, by its gravity, and drops on the film 3 contacting with the apperture $2a_1$. Thus, when the film 3 is driven to run in this state, the whole of the film is applied with the developer 9 to effect the development of the film. As for the composition of the developer 9, it is disclosed, for example, in U.S. Pat. No. 2,726,154.

The key points of the film cartridge as mentioned above are that the seal 46 attached on the apperture $2a_1$ of the container 2a is peeled off after the completion of the photographing, and the film, while charged in the camera or the projector, is driven to run in the contrary direction to that at the time of photographing, and is applied with the developer 9 from the container 2a while it is wound back, to effect the developing treatment. Therefore, a camera or a projector which can use the film cartridge of the above type is provided with means which effects the contrary running of the film after the photographing and the film development, but the attitude at the time of the film development is just same as that at the time of photographing or projecting the film so that the remaining developer 9 leaks out into the cartridge even after the developing treatment particularly when the development is effected in the projector, causing adverse effects on other parts and redevelopment of the already developed film.

FIG. 3 shows one embodiment of the projector according to the present invention which has eliminated the above defects of the prior devices shown in FIG. 1 and FIG. 2.

In FIG. 3, 10 is a projector on which the film cartridge shown in FIG. 1 can be mounted, in which means for selectively driving the film either toward the supplying shaft 5 or toward the winding shaft 6 is provided. 11 is a handle provided outside the projector 10, 12 is a lens barrel having an optical lens, and 13 and 14 are respectively a leg attached to the projector 10. The leg 14 is screwed with the projector 10, so that its length can be adjusted by screwing it in or out of the projector, and these legs contribute to fix and hold the projector on the base. 15 is a leg having a recess 15a at its portion, which is held rotatably by the shaft 16 on the projector 10, and when this leg is rotated clockwise it is housed in the leg housing portion 10a, and when rotated anticlockwise, it projects from the projector and fixedly supports the projector on the base, and this leg 15 is used for the projector 10 at the time of developing the film. 17 is a hollow cylindrical member fixed to the projector 10 which houses a spring 18 therein. 19 is a ball bearing arranged between the compression spring 18 and the leg 15, which is always pressed by the spring 18 against the leg 15 to prevent the leg 15 from free rotation by its friction contact. The recess 15a engages with the ball bearing 19 when the leg 15 is housed in the portion 10 and contributes to prevent the leg from projecting from the portion 10.

The projector of the above structure according to the present invention is able to be charged with the non-developed film cartridge which has been exposed by a separate camera, and the non-developed film is developed when it is wound back by the projector.

Next explanations shall be made on the operation of the projector in case of the film development as shown in FIG. 1.

First, the leg 15 of the projector 10 is rotated clockwise prior to the charging of the film cartridge to project the leg 15 from the projector 10.

Then, the projector 10 is turned down sidelong as shown in FIG. 2 and the film cartridge 1 is charged, and the thread 47 of the cartridge 1 is pushed to take away the seal 46 from the apperture $2a_1$ simultaneously when the film feed driving in the projector is inversed to wind back the film 3 in the film cartridge. At this time, as the apperture $2a_1$ of the developer container 2a is positioned at the lowest end of the container 2a, the developer 9 leaks by its gravity from the apperture $2a_1$ to be applied on the film surface and to effect the development successively. In this way when the film is completely wound back, the film development is completed. Then, when the projector 10 is restored to its original position so as to be supported by the legs 13 and 14, and the leg 15 is rotated anticlockwise to be housed into the portion 10a, the film projection becomes ready.

Under this state, when the projecting mechanism is rotated in a normal direction (projection is started), the pictures recorded on the film is projected because the film is already developed.

FIG. 4 shows a modification of the emobodiment of the projector shown in FIG. 3 in which the construction of the leg used at the time of the film development is different from that shown in FIG. 3, and shows the photographing state after the developing treatment of the film 3 in the film cartridge. The same numerical references are used in FIG. 4 to show the same members as in FIG. 3.

In FIG. 4 the leg 21 used at the time of the development has a member 21a which is connectable slidably to the hollow holding member 22 planted on the projector 10, and the member 21a is provided with a concave portion 21a. 52 is an elastic click-stop member fixedly provided on the projector 10, which maintains the pulled-out state of the leg 21 when it is pulled out, and is provided with a convex portion 22a engagable to the concave portion $21a_1$ of the member 21a. 23 is a knob engaged with the member 21a of the leg 21 from outside the projector 10, which causes the leg to project from or enter the projector 10, and 24 is an elongated hole for allowing the sliding movement of the knob 23.

With the above structure, when the knob 23 is slided in the direction of A in the drawing for developing the film in the cartridge, the leg 21 is thereby projected out of the projector 10, and the leg 21 is held in its projecting state by the click-stop member 52.

On the other hand, when the projector 10 is turned down sidelong by 90° from the state shown to be supported by the leg 21, it is possible to develop the film.

Figure 5:
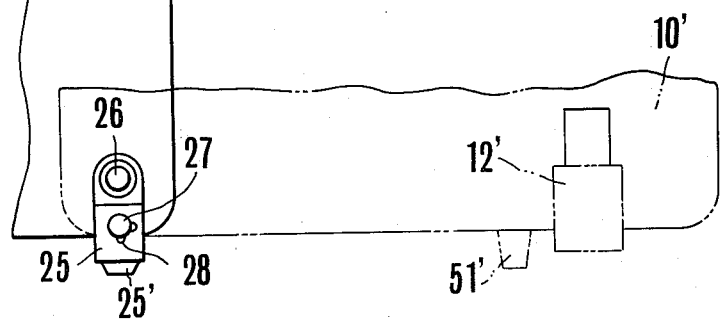
FIG. 5 is a front view of a third embodiment of the projector of the present invention, showing only the main portions.

FIG. 5 shows another modification having different legs 14 and 15 from those shown in FIG. 3 and FIG. 4, in which the leg 25 serves as the legs 14 and 15 in combination. 25 is a leg portion housing slidably the leg 25', 26 is a shaft rotatably supporting the leg portion 25 planted on the projector 10, 27 is a knob for adjusting the length of the leg 25' housed in the leg portion 25 and locking the same, and 28 is an elongated hole for permitting the sliding movement of the knob 27.

The leg portion 25 of the above structure is rotated anticlockwise to the position Y in the drawing and locked and then the projector is turned down longside to effect the developing treatment. On the other hand, in case of the film projection, the leg 25 is again rotated clockwise to the position Y and locked and the projector is erected.

Figure 6:
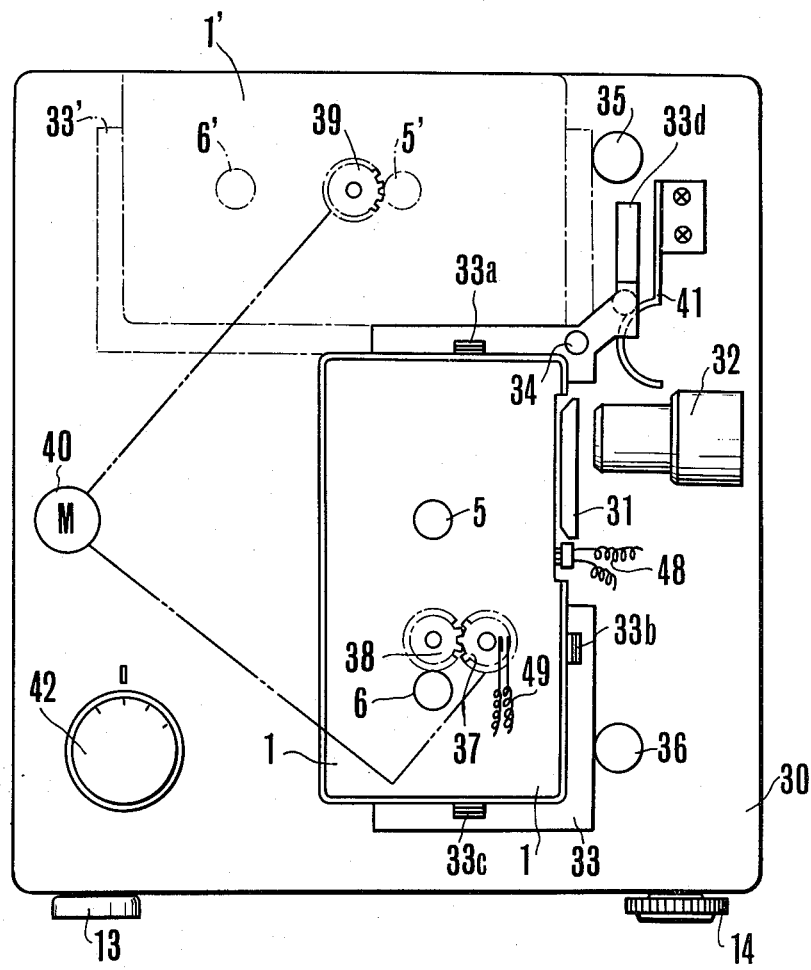
FIG. 6 is a plane view showing main portions of a fourth embodiment of the projector of the present invention.

FIG. 6 shows a fourth embodiment of the projector suitable for the film cartridge shown in FIG. 1. In this drawing, the film cartridge 1 defined by a solid line is shown to be positioned at the projection state, and the film cartridge 1' defined by a dotted line is shown to be positioned at the time of the film development as well as of winding back the projected film to the original position. In this drawing, the closing device for preventing the re-exposure is not shown, but shown in FIG. 8. 30 is a projector, 31 is a projecting device, 32 is a projecting lens, 33 is a cartridge holder having contact members 33a, 33b for holding the cartridge and a lever 33d engaged with outside operating means, which holder is held rotatably on the shaft 34 planted on the projector 31. 35 and 36 are respectively a stopper for limiting the rotation of the cartridge holder 33, 40 is a driving motor, 39 is a gear which contacts with the shaft 5 when the cartridge is positioned at the development position to give a rotation power to the shaft 5 and wind back the film. 38 is a gear which engages with the gear 37 rotated by the driving motor 40, and this gear 38 contacts with the shaft 6 when the film cartridge is positioned at the projection position to give rotation power to the shaft 6 and to wind up the film. 41 is a click-spring fixed on the projector 41 for holding the cartridge holder 33 at a predetermined position. 42 is a main switch for controlling the closing device.

Figure 7:
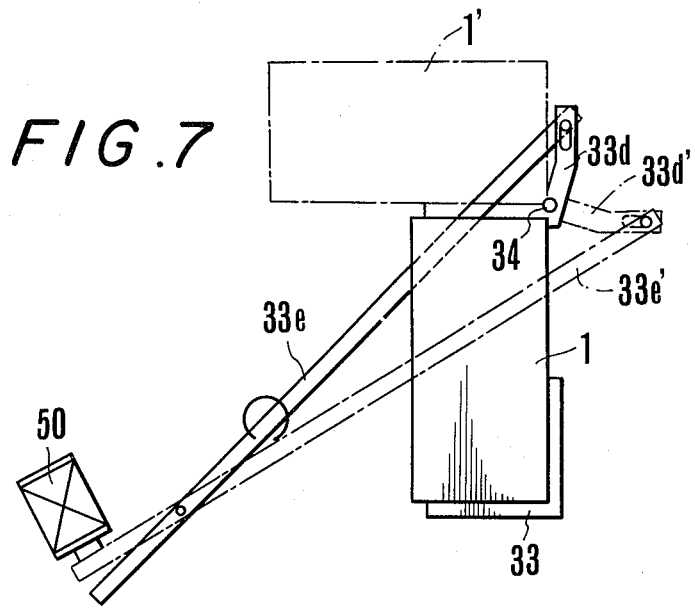
FIG. 7 explains the operation of the cartridge holder of the projector shown in FIG. 6.
Figures 9A, 9B:
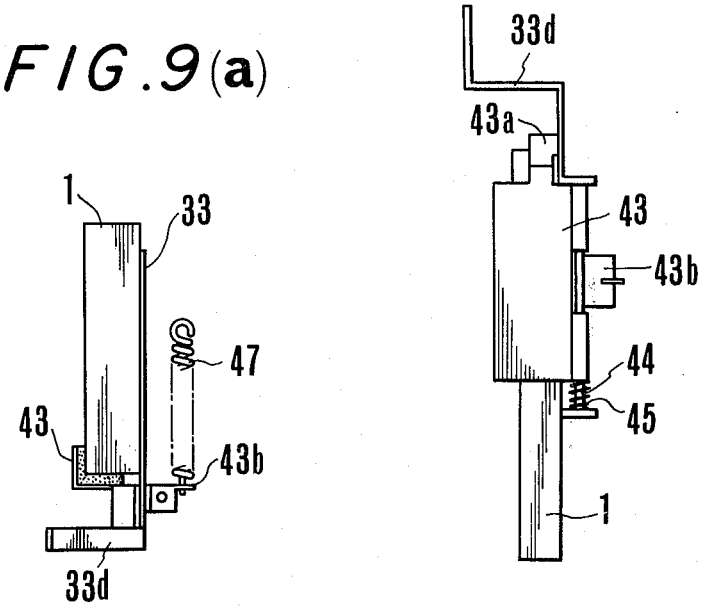
FIG. 9 explains the operation of the cartridge holder shown in FIG. 8 and FIG. 9(a) and FIG. 9(b) show respectively a lower bottom.
Figure 8:
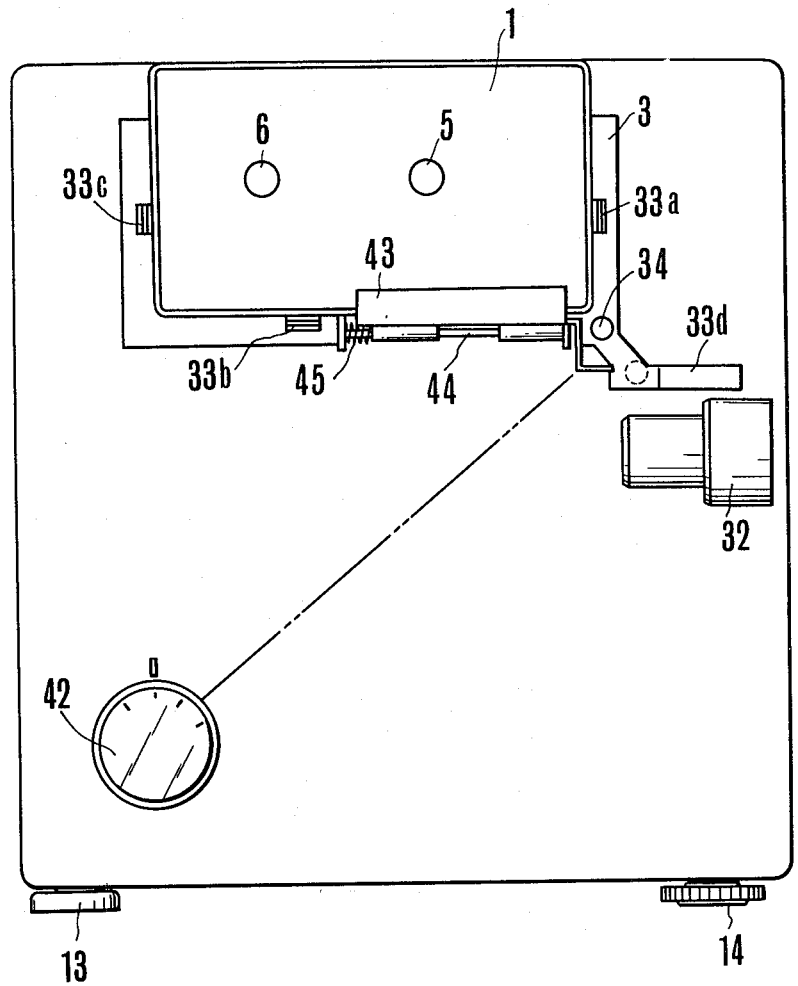
FIG. 8 is a plane view showing main portions of a fifth embodiment of the projector of the present invention.

In FIGS. 7, 8 and 9 the film cartridge is shown to be positioned at the position for film development shifted from the position for film projection shown in FIG. 6. 43 is a shielding plate for preventing the re-exposure due to the light coming in from the apperture of the cartridge 2 when the exposed film 3 is developed within the projector 31, and this shield plate is supported slidably on the shaft 44 held by the cartridge holder 33. 45 is a compression spring arranged on the shaft 44, 47 is a pulling spring for maintaining the cartridge holder at a position permitting the film development.

In the closing device of the above structure the shielding plate is pushed toward the arrow B against the compression spring 45 when the main switch 42 is set to the development position after the cartridge 1 has been charged in the projector 31, and the shielding plate comes to a position at which the claw 43b extending from the shielding plate 43 gets cross the lever 33d of the cartridge holder 33. At this position, the claw 43a of the shielding plate 43 engages with the lever 33d of the cartridge holder 33 to shield completely the opening portions of the appertures 1a and 1b of the cartridge. When set to this state, the exposed film contained in the cartridge is developed while it is wound back when the motor is given power since the gear 39 driven by the motor 40 is in engagement with the shaft 5.

In this way, when the film development is completed, the lever 33d is rotated anticlockwise to disengage the lever 33d with the claw 43a of the shielding plate 43 so that the shielding plate 43 escapes by means of the pulling spring to allow smooth movement of the cartridge holder 33 thereafter, and the film cartridge 1 is positioned at the position for film projection by the holder 33 as shown in FIG. 6.

In this state, when the main switch 42 is set to the projecting position, the film 3 within the cartridge is projected. This projecting means is not shown, but any conventional means may be used. When the projecting means is driven, the motor 40 is actuated to rotate the gear 37. Further the rotation of the gear 37 is transferred to the winding shaft 6 of the cartridge 1 through the gear 38 to wind up the film 3 which has been projected.

In the first, second and third embodiments as described above, the film cartridge is changed over to the projection position and the development position manually. However it is possible to automatically restore the cartridge to the position at which the shaft 5 of the film cartridge is pressed against the gear 37 after the completion of the film projection as shown in FIG. 6 by attaching a silver foil recorded with signals to the film end and detecting the signal by means of an electrical contact 48 as shown in FIG. 6, and it is also possible to automatically restore the cartridge 33 from the projection position to the winding position by providing a contact 49 etc which actuates upon sensing the stop of the gear 37 because the winding shaft 6 and the gear 37 associated therewith are in stop-state after the completion of the film projection. FIG. 7 shows an embodiment in which the cartridge is moved by using a magnet 50.

As understood from the foregoing description, the projector of the present invention has the features that a developer container is provided within the cartridge, which container is provided with at its upper portion an opening having means for applying the developer uniformly on the film surface which has been exposed while the cartridge is taking the projection attitude, and that the development of the exposed film is done within the projector, and that the projector assumes a different attitude and position for each of the development and the projection, and following advantages are obtained from the above features.

1. In case when the feeding and winding spools are arranged as closely as possible and the projector is provided on the extended line of the both spool, it is possible to an exposure and projecting apperture portion and a light source path to the supply spool at the time of projection and to a portion of the spool which plays as a winding spool at the time of the development and the film winding back, and also it is possible to provide a developer container and developer applying means on the remaining portion, so that the structure can be very simplified.

2. At the time of development, the developer applying means of the container is arranged longside to effect uniform application of the developer on the surface of the exposed film, and after the development is completed the opening portion of the developer container is turned upward so that there is no danger of deposition of the remaining developer on the film and of no danger of redevelopment of the film.

3. As the opening portion of the developer applying means is arranged apart from the film gate, there is no problem that the developer adheres to the film gate and causes hindrance at the time of film projection.

4. As the opening portion of the developer applying means is normally packaged, and even if it is opened by errors, the developer does not flow out because the photographing attitude and the projection attitude are same and different from the development attitude.

What is claimed:

1. A projector suitable for a film cartridge in which developer leaks by its gravity from a developer leakage opening of a developer storing means so as to develop the film, which comprises means for varying the opening direction of the developer leakage opening, which varies the attitude and position of the film cartridge to a first position where the developer leaks by its gravity from the opening and to a second position where the developer is prevented from leaking from the opening, driving means for causing actuation of the projector and film feeding means which causes the film to run upon receipt of driving power from the driving means, and winds back the film to effect the film development when the film cartridge is positioned at the first position by the opening direction varying means.

2. A projector according to claim 1 in which the opening direction varying means has a holding means for holding the film cartridge, which holding means changes the film cartridge selectively to the first and second positions to operatively engage the film cartridge with the film feeding means, thereby it is possible to make the film run in a direction contrary to the direction at the time of normal photographing when the film cartridge is at the first position, and it is possible to make the film run in a direction same as the direction at the normal photographing when the film cartridge is at the second position.

3. A projector according to claim 2 in which the opening direction varying means has signal detecting and controlling means which detects a signal of the finishing end of the film at the time of completion of the film running in the contrary direction to cause the holding means to move the film cartridge from the first position to the second position.

4. A projector according to claim 3 in which the signal detecting and controlling means has a detecting member for detecting the finishing end signal, and a magnetic member which is controlled by the signal detected by the detecting member, and moves the holding member by its excitation and non-excitation.

5. For a film cartridge in which developer leaks by gravity onto a film from a developer leakage opening in a developer container means so as to develop the film, a projector, comprising:

a housing having a film cartridge chamber to retain the film cartridge;

said housing being positionable in a first position which allows the developer of the film cartridge when it is mounted in the housing to leak by gravity from the developer leakage opening onto the film, and a second position which does not allow the developer to leak by gravity;

first position retaining means for retaining the housing in the first position and including a plurality of legs protruding from said housing;

a second position retaining means to retain the housing in the second position and including a plurality of legs which can selectively protrude from the housing; and a driving means to run said film, said driving means being selectively changeable from a running direction to a reverse direction, so that when the housing is in its first position the film in a cartridge in the housing can be developed as the film is rewound.

6. A projector as in claim 5, wherein the first and second position retaining means are mounted on the housing along planes substantially transverse to one another.

7. An apparatus as in claim 6, wherein at least one of said legs of said first retaining means is axially retractable into and out of the housing.

8. A projector as in claim 5, wherein the plural number in said second position retaining means are variable in length.

9. A projector as in claim 5, wherein said second position retaining means includes means to permit selectively shifting the legs to first locations within the housing and to second locations protruding from the housing.

10. A projector as in claim 9, wherein said first position retaining means includes an axle mounted on the housing, said legs in said second position retaining means being pivotable about said axle from a position transverse to the housing to a position parallel to the housing, said legs having a rounded shape near the axle and first and second notches along said rounded shape, said housing having a recess and a detent in said recess as well as biasing means for biasing the detent against the rounded shape so that when a leg is moved to one location the detent snaps into one notch and when the leg is moved to the other location the detent snaps into the other notch.

11. A projector as in claim 9, wherein said housing includes a recess for one of the legs of said first retaining means, mounting means for permitting said leg to be shifted into and out of said recess, biasing means in said housing recess, said biasing means engaging said leg and selectively biasing the leg either into the one position within the recess or another position outside the recess.

12. A projector as in claim 11, wherein one of said legs is common to said first and second retaining means and is pivotable from a first position parallel to the legs of said first retaining means to a second position parallel to the legs of said second retaining means.

13. A system as in claim 12, wherein the plural number in said second position retaining means are variable in length.

14. A projection system for self-developing of film, comprising:

a housing, a cartridge mounted in the housing, said cartridge having film, said cartridge having film developer liquid storage means for storing film developer liquid, an opening in the storing means through which said film developing liquid can leak gravitationally, and a removable blockage across the opening;

said cartridge being movable to a position in which the film developer liquid can leak gravitationally through the opening onto the film when the blockage is removed;

means in the cartridge for passing film along a path in forward and reverse directions past the opening so that developer liquid can be spread over the film when the film developer leaks through the opening;

said cartridge having reflection means to reflect light transverse to the film path;

a projection apparatus for developing the film and projecting it;

said projection apparatus comprising said housing and means in said housing for retaining the cartridge chamber in one of two predetermined positions, said projection apparatus including driving means to control movement of the film within the film cartridge chamber in forward and reverse directions;

said projection means including a light source for projecting light onto said reflection means in said cartridge; said projection means including optical means placed in the path of light reflected by said reflection means and penetrating through film in the film path to form an image with the light penetrating the film path;

said housing being movable to a first position in which the cartridge is located so that the developer can leak onto the film gravitationally, and to a second position where the cartridge does not allow leakage of developer onto the film;

first position retaining means to maintain said housing in said first position, said first position retaining means including a plurality of legs protrudable out of said housing; and second position retaining means for retaining said housing in the second position, said second position retaining means including a plurality of legs selectively protrudable out of said housing;

said film being developable in said second position while said driving means winds the film in the reverse direction, said film being projectable when said housing is in the second position.

15. A system as in claim 14, wherein the first and second position retaining means are mounted on the housing along planes substantially transverse to one another.

16. A system as in claim 15, wherein said housing includes a recess for one of the legs of said first retaining means, mounting means for permitting said legs to be shifted into and out of said recess, biasing means in said housing recess, said biasing means engaging said leg and selectively biasing the leg either into the one position within the recess or another position outside the recess.

17. The system as in claim 4, wherein said second position retaining means includes means to permit selectively shifting the legs to first locations within the housing and to second locations protruding from the housing.

18. A system as in claim 17, wherein said first position retaining means includes an axle mounted on the housing, said legs in said second position retaining means being pivotable about said axis from the position transverse to the housing to a position parallel to the housing, said legs having a rounded shape near the axle and first and second notches along said rounded shape, said housing having a recess and a detent in said recess as well as biasing means for biasing the detent against the rounded shape so that when a leg is moved to one location the detent snaps into one notch and when the leg is moved to the other location the detent snaps into the other notch.

19. A system as in claim 14, wherein said reflection means includes a mirror.

20. A system as in claim 14, wherein said blockage includes a seal member attached to said cartridge at said leakage opening and further including a string partially projecting out of the film cartridge engaged to the seal member, said seal member being removable from the cartridge by drawing the string.

* * * * *